(12) United States Patent
Hsiao et al.

(10) Patent No.: US 6,515,502 B1
(45) Date of Patent: Feb. 4, 2003

(54) TERMINATION CIRCUIT WITH VOLTAGE-INDEPENDENT CHARACTERISTICS

(75) Inventors: Shun-Yuan Hsiao, Hsinchu (TW); Chun-Ming Leu, Taoyuan (TW)

(73) Assignee: Silicon Integrated Systems Corporation, Hsinchu (TW)

( * ) Notice: Subject to any disclaimer, the term of this patent is extended or adjusted under 35 U.S.C. 154(b) by 0 days.

(21) Appl. No.: 09/945,761

(22) Filed: Sep. 5, 2001

(51) Int. Cl.[7] ............... H03K 17/16; H03K 19/003
(52) U.S. Cl. .............................. 326/30; 326/86
(58) Field of Search ..................... 326/30, 31, 85, 326/86, 87, 90, 91

(56) References Cited

U.S. PATENT DOCUMENTS 5,382,847 A * 1/1995 Yasuda ................ 326/68
6,054,881 A * 4/2000 Stoenner ............... 327/112

FOREIGN PATENT DOCUMENTS

EP        0327160 A1 * 8/1989

* cited by examiner

Primary Examiner—Daniel D. Chang
(74) Attorney, Agent, or Firm—Nixon Peabody LLP; Donald R. Studebaker

(57) ABSTRACT

The present invention provides a termination circuit with voltage-independent characteristics. The termination impedance circuit provided is coupled to a transmission line from a driver circuit. The termination impedance circuit includes a transistor-type resistor of a size A, and an impedance compensation circuit. The transistor-type resistor of a size A is operative to receive a first control signal and has a node coupled to the transmission line. The impedance compensation circuit includes a pair of transistors and a transistor of size B. The ratio of (A/B) is such that a substantial constant output impedance is achieved as large pull-down or pull-up voltage excursion at the transmission line occurs.

22 Claims, 5 Drawing Sheets

TERMINATION CIRCUIT WITH VOLTAGE-INDEPENDENT CHARACTERISTICS

BACKGROUND OF THE INVENTION

1. Field of the Invention

The present invention is related to the transistor-level termination circuit with voltage-independent characteristics.

2. Description of the Related Arts

In the design and implementation of electronic systems employing integrated circuits, undesired transmission line effect is of a particular concern. As the signal travels down to the transmission line, reflection may occur on the line. The reflection is caused by, for example the mismatched impedance between the driver circuit and the transmission line. If left uncorrected, the reflection may cause the signal's voltage to swing outside of the defined "0" and "1" voltage level. This causes the receiving device to incorrectly interpret the received signal and generate erroneous results.

To address the impedance mismatch between the driver and the transmission line or the receiver circuit and the transmission line, a variety of techniques have been known in the prior art. When it comes to compact size, low cost, the ability to be digitally trimmed as well as enabled or disabled by control signal, the most popular method is to use a MOS termination circuit. FIG. 1 (a) shows a conventional MOS termination circuit using PMOSFET, while FIG. 1 (b) shows another conventional MOS termination circuit using NMOSFET.

In FIG. 1 (a), assume initially a low signal is asserted to the input node 125 to enable PMOSFET 120 before the driver 100 outputs a low signal to the transmission line 110. When the PMOSFET 120 is turned on and driver 100 outputs low signal, the voltage levels of the drain node and the gate node of PMOSFET 120 are low. The PMOSFET 120 works in saturation region. When the driver 100 outputs high signal, the drain node of PMOSFET 120 is pulled high, and PMOS 120 operates in triode region. Therefore, during the pull-up process, the value of output impedance of PMOSFET 120 changes from high to low. To the contrary, during the pull-down process, the value of output impedance of PMOSFET 120 changes from low to high. The output impedance is voltage dependent. Similarly, the output impedance of circuit in FIG. 1(b) is also voltage dependent.

SUMMARY OF THE INVENTION

It is therefore an objective of the invention to provide a voltage-independent MOS termination circuit that is easy to be implemented by today's MOS process.

It is yet another objective of the invention to provide a MOS termination circuit which includes a impedance compensation circuit.

The termination impedance circuit provided is coupled to a transmission line from a driver circuit. The termination impedance circuit includes a transistor-type resistor of a size A, and an impedance compensation circuit.

The transistor-type resistor of a size A is operative to receive a first control signal and has a node coupled to the transmission line.

The impedance compensation circuit includes a pair of transistors and a transistor of size B.

The pair of transistors has a first node inputting a second control signal, a second node connected to the transmission line, and a third node outputting a third control signal.

The transistor of a size B has a first node inputting the third control signal, and a second node connected to the transmission line.

The ratio of (A/B) is such that a substantial constant output impedance is achieved as large pull-down or pull-up voltage excursion at the transmission line occurs.

DETAILED DESCRIPTION OF THE INVENTION

Figure 1A:
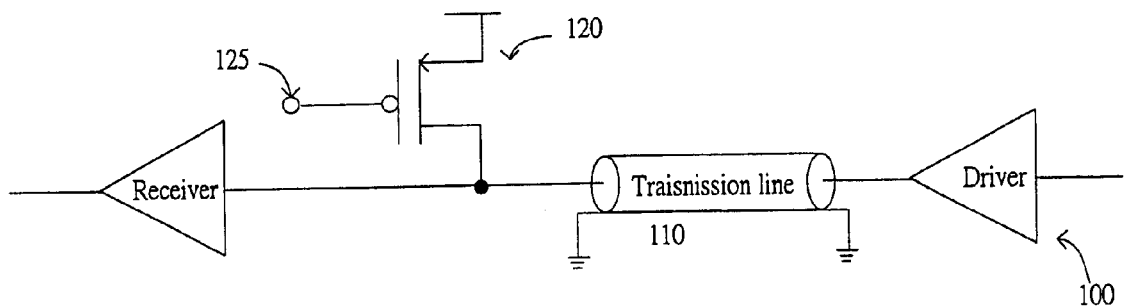
FIGS. 1 (a) and (b) respectively illustrates two conventional MOS termination circuits using PMOSFET and NMOSFET.

Although the circuits described in the followings are demonstrated with field effect transistors (FETS), yet the invention is intended to apply to any type of circuitry including, without limitation, bipolar junction transistor or combination of FETS with bipolar junction transistors, or other sort of semiconductor technology. Moreover, the invention may be implemented in any manner, such as with discrete devices or in an integrated circuit form.

Please refer to FIG. 2 (a), the first embodiment of the termination circuit includes a transistor-type resistor 210 of a size A, a CMOS pair including PMOSFET 220 and NMOSFET 230, a transistor 240 of a size B and an inverter 260. The CMOS pair and PMOSFET 240 constitute the impedance compensation circuit to the termination circuit. In preferred embodiment, the transistor-type resistor 210 is a PMOSFET and the transistor 240 is a PMOSFET.

The transistor-type resistor 210 is operative to receive a first control signal 265 and has a node 210A coupled to the transmission line 250. The pair of transistors (220, 230) has a control node 270 inputting a second control signal, an input node 230A connected to the transmission line 250, and an output node 280 outputting a third control signal. The ratio of (A/B) is such that a substantial constant output impedance is achieved as large pull-down or pull-up voltage excursion at the transmission line 250 occurs.

Assume initially the voltage of node 265 is low and the driver 200 outputs a low signal to the transmission line 250. Therefore PMOSFET 210, NMOSFET 230 and PMOSFET 240 are ON and the node 285 is at low voltage level. Since the drain nodes of PMOSFET 210 and PMOSFET 240 as well as the source node of NMOSFET 230 are connected to the transmission line 250, NMOSFET 230 is working in the triode region and both PMOSFET 240 and PMOSFET 210 are working in the saturation region. The voltage reference, Vss, provides a relatively stable voltage source, such as 3 or 5 volt, commonly used in MOS device.

The inverter 260 receives the signal 265. The node 270 is formed by coupling the output node of inverter 260 and the gate nodes of PMOSFET 220 and NMOSFET 230. When the node 270 receives the high signal, PMOSFET 220 is turned off and NMOSFET 230 is turned on. The drain nodes 280 of the NMOSFET 230 and PMOSFET 220 could track the voltage level of node 285.

Viewed from the node 285, the PMOSFET 210 and PMOSFET 240 act like two output resistors connected in parallel. Because PMOSFET 210 operates in saturation region, the output resistance of PMOSFET 210 is high. Since the voltage levels of node 280 could track the voltage of node 285 through NMOSFET 230, PMOSFET 240 is in diode-connected configuration. So the output resistance of PMOSFET 240 is relatively low. The output resistance of PMOSFET 240 contributes most of the output impedance of the termination circuit shown in FIG. 2(a).

Next, let us consider that the driver 200 is outputting a high signal to the transmission line. The output voltage level at node 285 starts increasing. The voltage levels appearing on the source node 230A of NMOSFET 230 and the drain node 210A of PMOSFET 210 are increasing. Eventually, PMOSFET 210 enters deep triode region the output impedance of which is much lower than that in saturation region. Meanwhile, the voltage level of source node 230A of NMOSFET 230 approaches the voltage level of gate node 270. Eventually, NMOSFET 230 is turned off. In succession, PMOSFET 240 is turned off. At the moment, the output impedance is determined only by PMOSFET 210.

By carefully choosing ratio of the size (A) of PMOSFET 210 and size (B) of PMOSFET 240, we obtain a highly linear output I/V transfer curve during the transition. Thus a constant output impedance termination circuit is achieved.

Figure 1B:
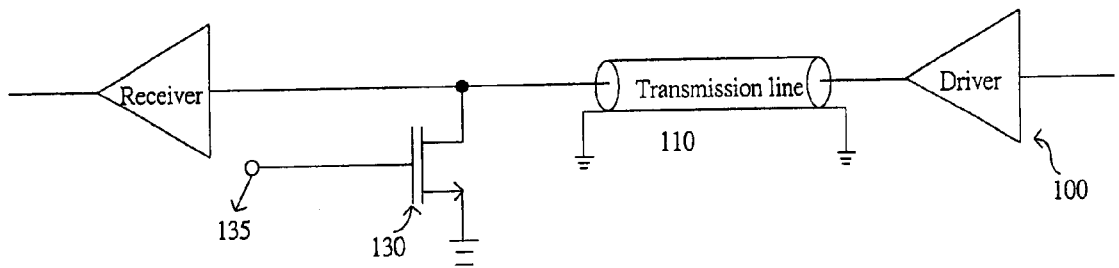
Figure 2A:
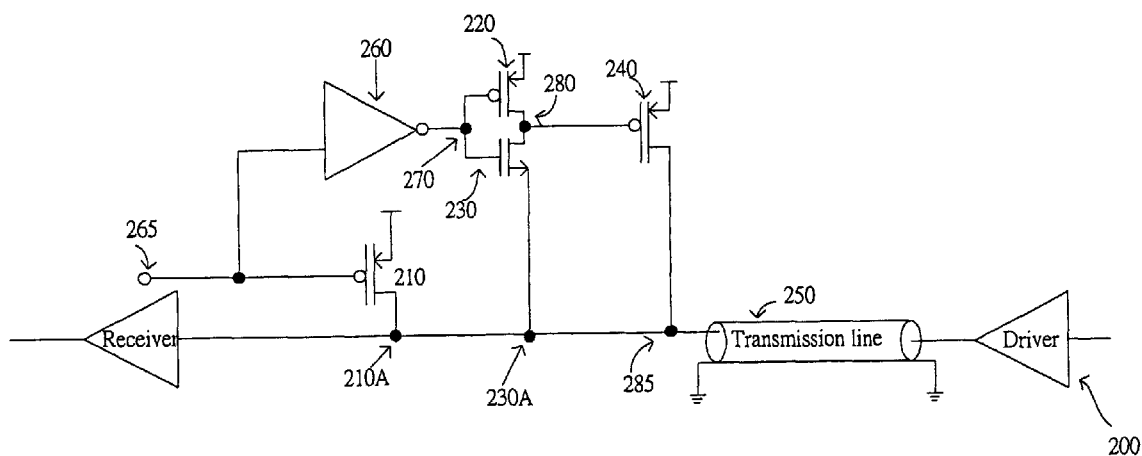
FIGS. 2 (a) and (b) respectively illustrates two embodiments of the termination circuit of present invention.
Figure 2B:
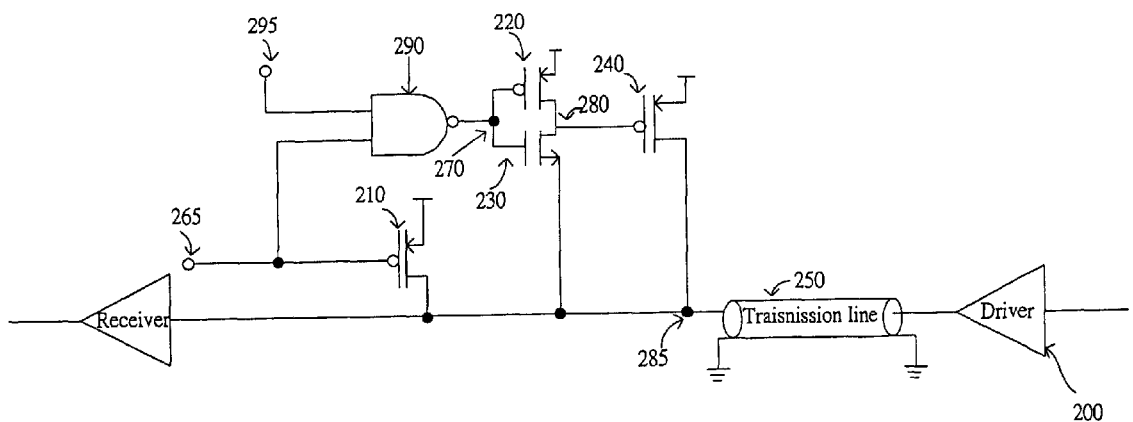

In another embodiment shown in FIG. 2(b), we use an NAND gate 290 and an enable signal 295 to perform the function of the inverter 260 mentioned in FIG. 2(a). To persons skilled in the arts, it is not difficult to derive the operations of FIG. 2 (b) from the recitations regarding FIG. 2(a). The output voltage level of NAND gate 290 is determined by the input signal 265. As the enable signal 295 is set to low voltage level, the NAND gate 290 always outputs a high signal. The NMOSFET 230, PMOSFET 220 and PMOSFET 240 are turned off. When this occurs, the termination circuit shown in FIG. 2(b) acts like a conventional circuit shown in FIG. 1 (a).

Figure 3A:
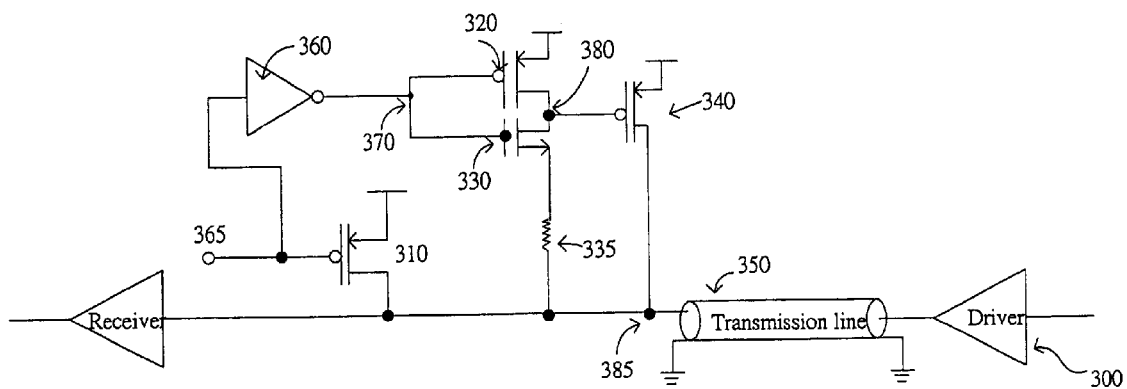
FIGS. 3 (a) and (b) respectively illustrates another two embodiments of the termination circuit of present invention.
Figure 3B:
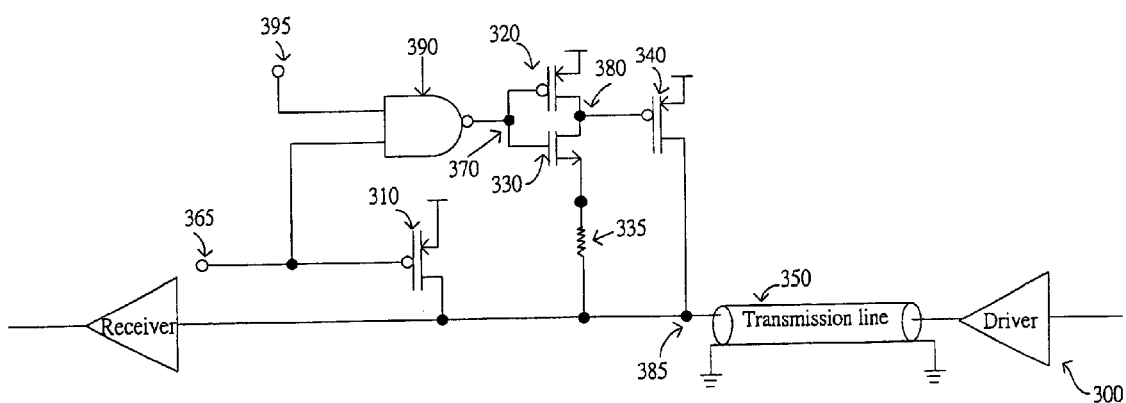

In another preferred embodiment of the present invention, a resistor is introduced to provide Electro Static Discharge (ESD) protection to the compensation circuit shown in FIG. 3 (a) and FIG. 3(b). As shown, a resistor 335 is disposed between the source of NMOSFET 330 and the transmission line 350. The resistor 335 provides a discharging path when ESD occurs, thus preventing the damage of transistor devices. It is not difficult to derive the operations of the termination circuit of FIG. 3 (a) and FIG. 3(b) from that of FIG. 2 (a) and FIG. 3(b).

In another embodiment shown in FIG. 4 (a), we use NMOSFET, instead of PMOSFET in FIG. 2 (a), as the transistor-type resistor 410 of size A and NMOSFET, instead of PMOSFET in FIG. 2 (a), as the transistor 440 of size B.

The transistor-type resistor 410 has a gate node receiving the first control signal 465, a source node coupled to a voltage ground and the node of the transistor-type resistor coupled to the transmission line 485 is a drain node 410A.

The output node of the transistor 440 of size B is a drain node 485, the control node is a gate node 480, and the transistor 440 of size B has a source node coupled to the voltage ground.

The pair of transistors (420, 430) includes an N-channel FET 430 and a P-channel FET 420. The N-channel FET 430 has a source node coupled to the voltage ground, a drain node and a gate node. The P-channel FET 420 has a gate node coupled to the gate node of the N-channel transistor 420 to form the control node 470 of the pair of transistors, a source node used as the input node 420A of the pair of transistors, and a drain node coupled to the drain node of the N-channel transistor to form the output node 480 of the pair of transistors. The transistor-type resistor 410 is operative to receive a first control signal 465 and has a node 410A coupled to the transmission line 450. The pair of transistors (420, 430) has a control node 470 inputting a second control signal, an input node 420A connected to the transmission line 450, and an output node 480 outputting a third control signal. The ratio of (A/B) is such that a substantial constant output impedance is achieved as large pull-down or pull-up voltage excursion at the transmission line 250 occurs.

Assume initially the voltage of node 465 is low and the driver 400 outputs a high signal to the transmission line 450. Therefore PMOSFET 420, NMOSFET 410 and NMOSFET 440 are ON and the node 485 is at high voltage level. Since the drain nodes of NMOSFET 410 and NMOSFET 440 as well as the source node of PMOSFET 420 are connected to the transmission line 450, PMOSFET 420 is working in the triode region and both NMOSFET 410 and NMOSFET 440 are working in the saturation region.

The inverter 460 receives the signal 465. The node 470 is formed by coupling the output node of inverter 460 and the gate nodes of PMOSFET 420 and NMOSFET 430. When the node 470 receives the high signal, PMOSFET 420 is turned off and NMOSFET 430 is turned on. The drain nodes 480 of the NMOSFET 430 and PMOSFET 420 could track the voltage level of node 485.

Viewed from the node 485, the NMOSFET 410 and NMOSFET 440 act like two output resistors connected in parallel. Because NMOSFET 410 operates in saturation region, the output resistance of NMOSFET 210 is high. Since the voltage levels of node 480 could track the voltage of node 485 through PMOSFET 420, NMOSFET 440 is in diode-connected configuration. So the output resistance of NMOSFET 440 is relatively low. The output resistance of NMOSFET 440 contributes most of the output impedance of the termination circuit shown in FIG. 4(a).

Next, let us consider that the driver 400 is outputting a low signal to the transmission line. The output voltage level at node 485 starts decreasing. The voltage levels appearing on the source node 420A of PMOSFET 420 and the drain node 410A of NMOSFET 410 are decreasing. Eventually, NMOSFET 410 enters deep triode region the output impedance of which is much lower than that in saturation region. Meanwhile, the voltage level of source node 420A of PMOSFET 420 approaches the voltage level of gate node 470. Eventually, PMOSFET 420 is turned off. In succession, NMOSFET 440 is turned off. At the moment, the output impedance is determined only by NMOSFET 410.

By carefully choosing ratio of the size (A) of NMOSFET 410 and size (B) of NMOSFET 440, we obtain a highly linear output I/V transfer curve during the transition. Thus a constant output impedance termination circuit is achieved.

Figure 4A:
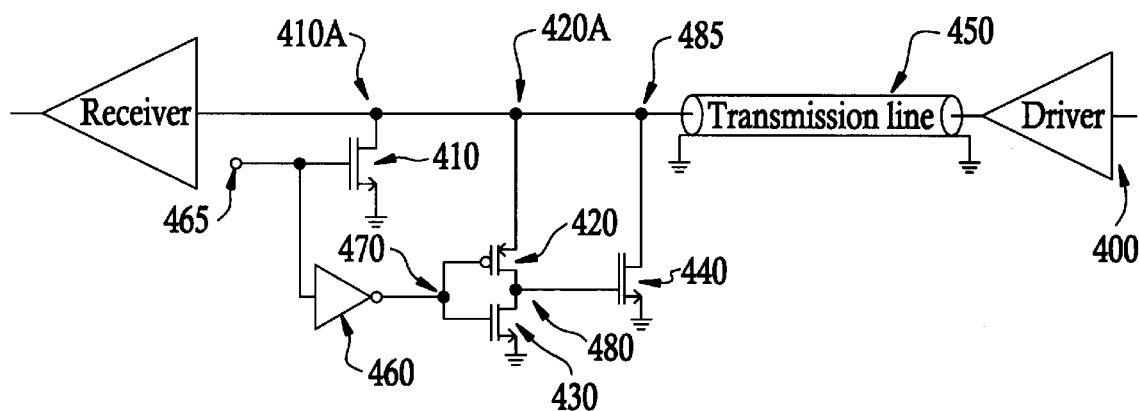
FIGS. 4 (a) and (b) respectively illustrates still another two embodiments of the termination circuit of present invention.
Figure 4B:
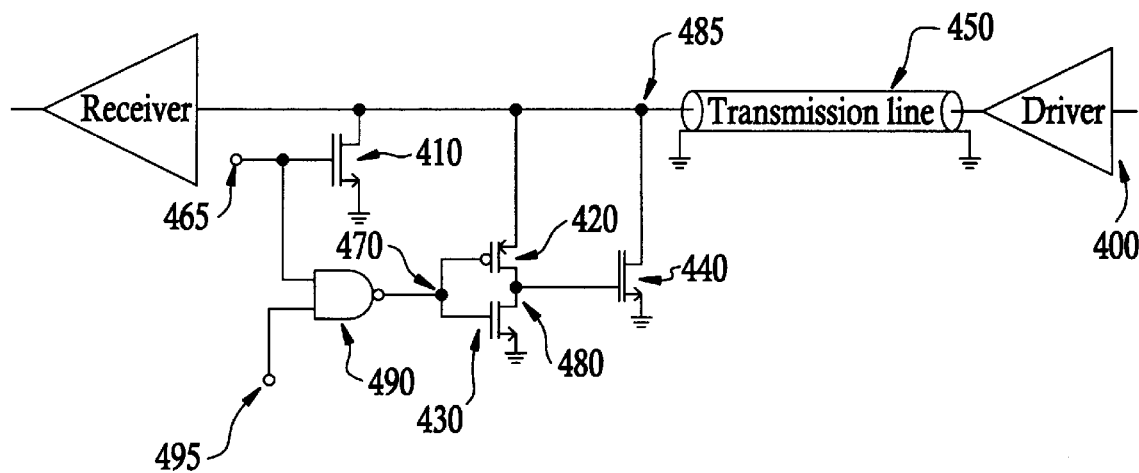

In another embodiment shown in FIG. 4 (b), we use a NAND gate 490 and an enable signal 495 to perform the function of the inverter 460 mentioned in FIG. 4(a). To persons skilled in the arts, it is not difficult to derive the operations of FIG. 4 (b) from the recitations regarding FIG. 4(a). The output voltage level of NAND gate 490 is determined by the input signal 465. As the enable signal 495 is set to low voltage level, the NAND gate 490 always outputs a high signal. The NMOSFET 430, PMOSFET 420 and NMOSFET 440 are turned off. When this occurs, the termination circuit shown in FIG. 4(b) acts like a conventional circuit shown in FIG. 1 (b).

Figure 5A:
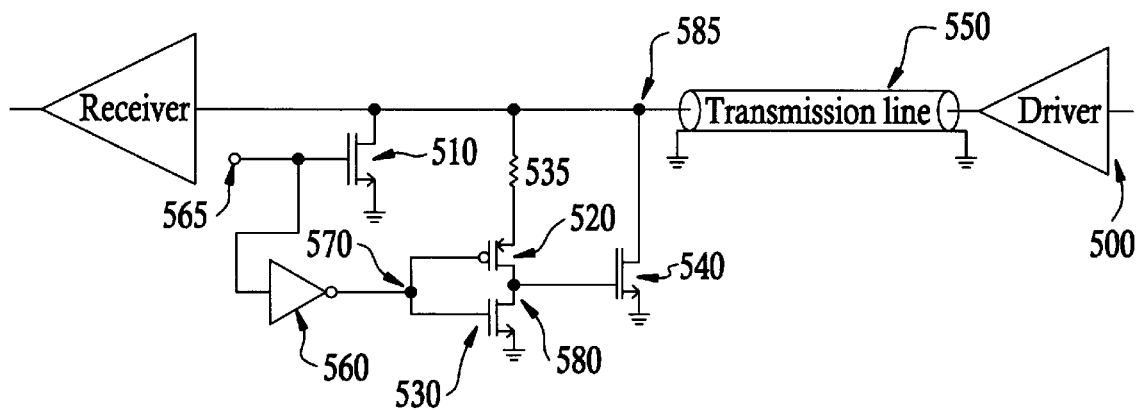
FIGS. 5 (a) and (b) respectively illustrates still another two embodiments of the termination circuit of present invention.
Figure 5B:
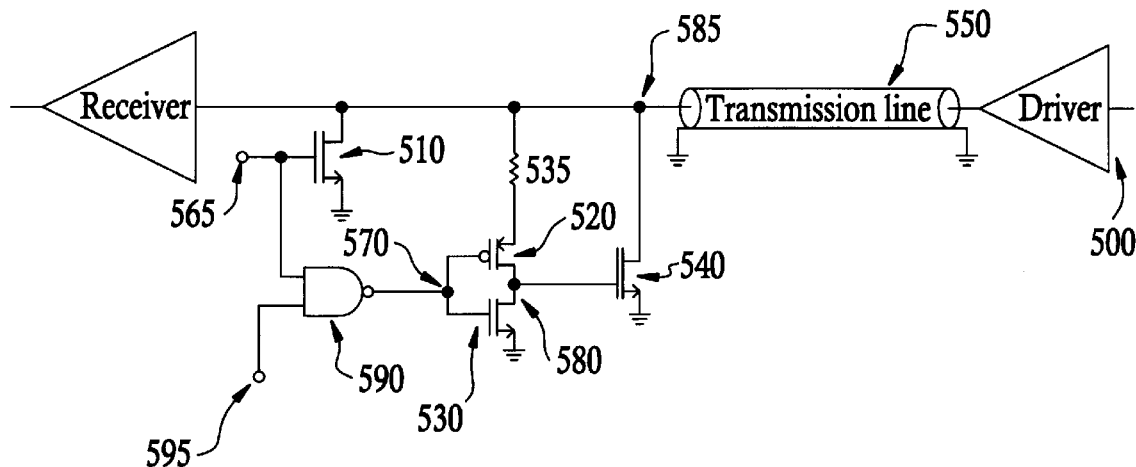

In another preferred embodiment of the present invention, a resistor is introduced to provide ESD protection to the compensation circuit shown in FIG. 5(a) and FIG. 5(b). As shown, a resistor 535 is disposed between the source of PMOSFET 520 and the transmission line 550. The resistor 535 provides a discharging path when ESD occurs, thus preventing the damage of transistor devices. It is not difficult to derive that the operations of the termination circuit of FIG. 5 (a) and FIG. 5(b) from that of FIG. 4(a) and FIG. 4(b).

In the foregoing specification the invention has been described with reference to specific embodiments. It will, however, be evident that various modification and changes may be made to thereto without departing from the broader spirit and scope of the invention. The specification and drawings are, accordingly, to be regarded in an illustrative rather than restrictive sense. Thus, it is intended that the present invention covers the modification and variations of this invention provided they come within the scope of the appended claims and their equivalents.

What is claimed is:

1. A termination impedance circuit coupled to a transmission line from a driver circuit, comprising:
    a transistor-type resistor of a size A being operative to receive a first control signal, the transistor-type resistor having a node coupled to the transmission line; and
    an impedance compensation circuit comprising:
        a pair of transistors having a first node inputting a second control signal, a second node connected to the transmission line, and a third node outputting a third control signal; and
        a transistor of a size B having a first node inputting the third control signal, and a second node connected to the transmission line;
        wherein the transistor-type resistor of the size A and the transistor of the size B are used to determine an output impedance, and a ratio of (A/B) is such that a substantial constant output impedance is achieved as large pull-down or pull-up voltage excursion at the transmission line occurs.

2. The circuit of claim 1, wherein the transistor-type resistor is a PMOS transistor which has a gate node receiving the first control signal, a source node coupled to a voltage reference, and the node of the transistor-type resistor coupled to the transmission line is a drain node of the PMOS transistor.

3. The circuit of claim 1, wherein the second node of the transistor of size B is a drain node, the first node is a gate node, and the transistor of size B has a source node coupled to the voltage reference.

4. The circuit of claim 1, wherein the transistor-type resistor is an NMOS transistor which has a gate node receiving the first control signal, a source node coupled to a voltage ground, and the node of the transistor-type resistor coupled to the transmission line is a drain node of the NMOS transistor.

5. The circuit of claim 1, wherein the second node of the transistor of size B is a drain node, the first node is a gate node, and the transistor of size B has a source node coupled to the voltage ground.

6. The circuit of claim 1, wherein the pair of transistors comprises:
    a P-channel FET having a source node coupled to the voltage reference, a drain node and a gate node; and
    an N-channel FET having a gate node coupled to the gate node of the P-channel transistor to form the first node of the pair of transistors, a source node used as the second node of the pair of transistors, and a drain node coupled to the drain node of the P-channel transistor to form the third node of the pair of transistors.

7. The circuit of claim 6, wherein the circuit further comprises an inverter, responsive to the first control signal, for generating the second control signal.

8. The circuit of claim 6, wherein the circuit further comprises a NAND gate, responsive to the first control signal and an enable signal, for generating the second control signal.

9. The circuit of claim 1, wherein the pair of transistors comprises:
    an N-channel FET having a source node coupled to the voltage ground, a drain node and a gate node; and
    a P-channel FET having a gate node coupled to the gate node of the N-channel transistor to form the first node of the pair of transistors, a source node used as the second node of the pair of transistors, and a drain node coupled to the drain node of the N-channel transistor to form the third node of the pair of transistors.

10. The circuit of claim 9, wherein the circuit further comprises an inverter, responsive to the first control signal, for generating the second control signal.

11. The circuit of claim 9, wherein the circuit further comprises a NAND gate, responsive to the first control signal and an enable signal, for generating the second control signal.

12. A termination impedance circuit coupled to a transmission line from a driver circuit, comprising:
    a transistor-type resistor of a size A being operative to receive a first control signal, the transistor-type resistor having a node coupled to the transmission line;
    an impedance compensation circuit comprising:
        a pair of transistors having a first node inputting a second control signal, a second node, and a third node outputting a third control signal; and
        a transistor of a size B having a first node inputting the third control signal, and a second node connected to the transmission line; and
    a resistor for providing ESD protection to the impedance compensation circuit;
    wherein the transistor-type resistor of the size A and the transistor of the size B are used to determine an output impedance, and a ratio of (A/B) is such that a substantial constant output impedance is achieved as large pull-down or pull-up voltage excursion at the transmission line occurs.

13. The circuit of claim 12, wherein the transistor-type resistor is a PMOS transistor which has a gate node receiving the first control signal, a source node coupled to a voltage reference, and the node of the transistor-type resistor coupled to the transmission line is a drain node of the PMOS transistor.

14. The circuit of claim 12, wherein the second node of the transistor of size B is a drain node, the first node is a gate node, and the transistor of size B has a source node coupled to the voltage reference.

15. The circuit of claim 12, wherein the transistor-type resistor is an NMOS transistor which has a gate node receiving the first control signal a source node coupled to a voltage ground, and the node of the transistor-type resistor coupled to the transmission line is a drain node of the NMOS transistor.

16. The circuit of claim 12, wherein the second node of the transistor of size B is a drain node, the first node is a gate node, and the transistor of size B has a source node coupled to the voltage ground.

17. The circuit of claim 16, wherein the circuit further comprises an inverter, responsive to the first control signal, for generating the second control signal.

18. The circuit of claim 16, wherein the circuit further comprises a NAND gate, responsive to the first control signal and an enable signal, for generating the second control signal.

19. The circuit of claim 12, wherein the pair of transistors comprises:
   a P-channel FET having a source node coupled to the voltage reference, a drain node and a gate node; and
   an N-channel FET having a gate node coupled to the gate node of the P-channel transistor to form the first node of the pair of transistors, a source node acting as the second node of the pair of transistors, and a drain node coupled to the drain node of the P-channel transistor to form the third node of the pair of transistors, and the source node is connected to the transmission line via said resistor.

20. The circuit of claim 12, wherein the pair of transistors comprises:
   an N-channel FET having a source node coupled to the voltage ground, a drain node and a gate node; and
   a P-channel FET having a gate node coupled to the gate node of the N-channel transistor to form the first node of the pair of transistors, a source node acting as the second node of the pair of transistors, and a drain node coupled to the drain node of the N-channel transistor to form the third node of the pair of transistors, and the source node is connected to the transmission line via said resistor.

21. The circuit of claim 20, wherein the circuit further comprises an inverter, responsive to the first control signal, for generating the second control signal.

22. The circuit of claim 20, wherein the circuit further comprises a NAND gate, responsive to the first control signal and an enable signal, for generating the second control signal.

* * * * *